United States Patent

Wobick et al.

(10) Patent No.: US 9,576,702 B2
(45) Date of Patent: Feb. 21, 2017

(54) FLEXIBLE ARMORED CABLE

(71) Applicant: Dekoron Wire & Cable LLC, Mount Pleasant, TX (US)

(72) Inventors: Robert F. Wobick, Mount Pleasant, TX (US); Mathew J. Nadakal, Rockwall, TX (US); Allie K. Ford, Mount Pleasant, TX (US); Jerry A. Simcik, Big Sandy, TX (US)

(73) Assignee: Dekoron Wire & Cable LLC, Mount Pleasant, TX (US)

( * ) Notice: Subject to any disclaimer, the term of this patent is extended or adjusted under 35 U.S.C. 154(b) by 0 days.

(21) Appl. No.: 14/254,682

(22) Filed: Apr. 16, 2014

(65) Prior Publication Data

US 2015/0107873 A1   Apr. 23, 2015

Related U.S. Application Data

(60) Provisional application No. 61/893,560, filed on Oct. 21, 2013.

(51) Int. Cl.
| | |
|---|---|
| *H01B 7/17* | (2006.01) |
| *H01B 7/04* | (2006.01) |
| *H01B 7/28* | (2006.01) |
| *H01B 13/00* | (2006.01) |

(52) U.S. Cl.
CPC ............. *H01B 7/28* (2013.01); *H01B 13/0009* (2013.01)

(58) Field of Classification Search
CPC .................................... H01B 7/17; H01B 7/04
USPC .................................................... 174/102 D
See application file for complete search history.

(56) References Cited

U.S. PATENT DOCUMENTS

| | | | | | |
|---|---|---|---|---|---|
| 2,817,363 | A | * | 12/1957 | Penrose | B21D 15/04 138/122 |
| 2,870,792 | A | * | 1/1959 | Penrose | H01B 7/20 138/121 |
| 3,173,990 | A | * | 3/1965 | Lamons | H01B 11/1808 174/102 D |
| 3,557,301 | A | * | 1/1971 | Priaroggia | H01B 7/201 174/102 D |
| 3,582,536 | A | * | 6/1971 | Miller | H01B 11/1839 138/121 |
| 3,745,232 | A | * | 7/1973 | Johnson | H01B 11/1873 174/102 D |
| 3,980,807 | A | * | 9/1976 | Woytiuk | H01B 13/221 174/102 D |
| 5,527,995 | A | * | 6/1996 | Lasky | H01B 9/022 174/102 D |
| 5,739,427 | A | * | 4/1998 | Yamaya | G01M 17/0072 73/115.07 |
| 5,739,472 | A | * | 4/1998 | Buck et al. | 174/107 |
| 5,760,334 | A | * | 6/1998 | Ziemek | H01B 7/202 174/102 D |
| 2009/0188694 | A1 | * | 7/2009 | Pereira | H02G 3/0468 174/112 |

* cited by examiner

*Primary Examiner* — Michael F McAllister
(74) *Attorney, Agent, or Firm* — Banner & Witcoff, Ltd.

(57) ABSTRACT

An armored cable features a core and an armor generally surrounding the core and having an inner diameter. The armor has a thickness of 0.001 to 0.100 times the inner diameter of the armor. In addition, the armor has corrugations with a pitch of 0.050 to 1.000 times the inner diameter of the armor. The armor has a corrugation depth of 0.010 to 0.400 times the inner diameter of the armor.

32 Claims, 4 Drawing Sheets

Flexural Rigidity Formula $\delta_{max} = Pl^3/48EI$ or $Pl^3/48\delta_{max} = EI$ = Flexural Rigidity

FLEXIBLE ARMORED CABLE

CLAIM OF PRIORITY

This application claims priority to U.S. Provisional Patent Application No. 61/893,560, filed Oct. 21, 2013, the contents of which are hereby incorporated by reference.

FIELD OF THE INVENTION

The present invention relates generally to armored cables and, in particular, to a flexible armored cable.

BACKGROUND

A cable consists of one or more wires, conductors, fibers, tubes, ropes, cords, strands, or any combination of the above, which may or may not be twisted, grouped, bunched, bundled, or otherwise assembled.

Cables are used in many applications and industries. One common use is in system control or monitoring applications. Such cables can be further classified into subcategories, including:

Instrumentation Cable: Designed for use in applications requiring critical signal transmission for measurement and systems monitoring of temperature, pressure, velocity, level, etc. Can include both analog signals and digital signals. This also includes specialty cables such as thermocouple extensions cables.

Control Cable: Cable primarily used for the remote control or operation of a device.

Power Cable: Designed to distribute power from a primary power source to various types of equipment.

Communication Cable: Consisting of such cables as telephone and telegraph cables, wiring for fire and burglar alarms, and similar central-station systems, these cables are used primarily for the transfer of information for purposes of control and/or monitoring over a network of devices. These cables often use fibers or specially designed electrical conductors to ensure fast and accurate information transfer. Communication cables are capable of transmitting power as well as both sending and receiving signals from connected devices, making them very versatile.

In many instances, cables themselves are not resilient enough to withstand the environment in which they are needed. In such cases, armors are added to the cable to provide additional protection from hazards such as falling objects, explosive gasses, or corrosive materials. These cables are referred to as armored cables.

An armored cable is a cable enclosed or wrapped in a protective outer sheath or covering. Armor typically protects the cable from moisture, chemical exposure, gaseous ingression, and mechanical damage. Armored cables may be used in electrical applications and designated as MC-HL (Metal-Clad, Hazardous Location) by Underwriters' Laboratories (UL).

To determine if a cable is MC-HL rated, UL follows the recommendations of the National Electric Code (NEC). NEC organizes armored cables by applications, grouped by classes and divisions or zones.

There are three classifications for hazardous locations—Class I, Class II, and Class III. A location is considered a Class I location if there is a presence of flammable gases or vapors in the air, such as natural gas or gasoline vapor. As illustrated in Table 1, there are 5 subclassifications of Class I locations—two Divisions and three Zones.

The most widely used subclassification system in the United States consists of two divisions—Division 1 and Division 2—and was developed by the NEC. A location classified as a Division 1 contains a high enough concentration of gasses or vapor to create an explosive atmosphere during normal operating conditions. A Division 2 location is less likely to see such an atmosphere.

Class I locations may also be classified by one of three types of zones—Zone 0, Zone 1, and Zone 2. This is an NEC-adopted classification system originally developed by the International Electrotechnical Commission (IEC). While it is less widely used in the United States, this system is very common worldwide. Zone 0 locations are similar to Division 1 locations, and are exposed to ignitable atmospheres continuously or for long periods of time. Zone 1 locations are exposed to the same conditions, however, the exposure is intermittent. Zone 0 locations require additional installation standards to be met, and require all systems to be intrinsically safe.

MC-HL armored cables are considered to be suitable for use in Class I, Division 1 and/or Zone 1 locations, and may even be installed in Class I, Zone 0 locations, so long as they are installed accordingly.

TABLE 1

| Hazardous Location Classifications | | |
|---|---|---|
| Class | Division | Zone |
| Class I: Flammable Gases, Vapors, or Liquids | Division 1: Where ignitable concentrations of flammable gases, vapors or liquids can exist all or some of the time under normal operating conditions. | Zone 0: Where ignitable concentrations of flammable gases, vapors or liquids can exist all of the time or for long periods at a time under normal operating conditions. Zone 1: Where ignitable concentrations of flammable gases, vapors or liquids can exist some of the time under normal operating conditions. |

TABLE 1-continued

Hazardous Location Classifications

| Class | Division | Zone |
|---|---|---|
|  | Division 2: Where ignitable concentrations of flammable gases, vapors or liquids are not likely to exist under normal operating conditions. | Zone 2: Where ignitable concentrations of flammable gases, vapors or liquids are not likely to exist under normal operating conditions. |

The UL 2225 standard explains the design and performance requirements of MC-HL cables. One such example of these cable performance requirements is the UL 2225 Mechanical Impact test. During this test, the cable is subjected to the impact from a twenty-five pound weight, dropped from an elevation of one foot above the cable. A flat, metal edge of the weight impacts the cable, which is resting on a rounded metal base. During the test, the cable is connected to an electrical power source, and energized. If a short occurs, the test is considered a failure. UL 2225 requires that eight out of a total of ten tests have passing results in order for a cable to meet the standards of resistance to mechanical impact for MC-HL cables.

The most common type of cable armor used in Class I, Division 1 locations is continuously-welded and corrugated aluminum armor. Manufacturers typically build these cables by wrapping or forming an aluminum strip around a cable before applying a continuous weld to join the aluminum strip longitudinally and applying corrugations by the use of a mechanical rotating head.

UL 2225 includes many performance requirements for MC-HL cables; however, the requirement to pass the UL 2225 Mechanical Impact Test is usually the test that dictates the armor design. Aluminum strips with a thickness of 0.025" or greater is the industry standard when making MC-HL designated cables. Other properties of the aluminum armor, such as the depth and pitch of the corrugations, affect test performance as well. Due to the thickness of the aluminum and the forming limitations, the existing armors inherently have limited flexibility and higher flexural rigidity, limited bending radii, and low bending fatigue resistance.

Furthermore, while many manufacturers produce armored cables capable of bending, and market them as flexible cable armor, none of these armored cables are rated for use in Class I, Division 1 hazardous locations. Examples of the various categories of flexible cable armors include:

Metal Braided Armor: Strands of metal (typically copper, plated copper, or stainless steel) are woven to form a mechanical covering or "braid" over the cable. Since braided armors are not hermetically sealed and offer little impact resistance, they are not considered compatible for use in Class I, Division 1 hazardous locations.

Interlocked Armor: In this armor, aluminum strips are wrapped around a cable. The edges of these small aluminum strips are locked to form a flexible tube. This armor does provide decent impact resistance, however, since the armor is not hermetically sealed, it is not considered compatible for use in Class I, Division 1 hazardous locations.

Served Wire Armor (SWA): This armor consists of several metal wires (typically galvanized steel or aluminum) which are wrapped, or "served", around the cable to provide protection. As in the examples above, the served wire armor does not provide a sealed environment and offers only slight impact resistance. Therefore, it is not considered compatible for use in Class I, Division 1 hazardous locations.

Under certain conditions, the control rooms and/or device installations (such as those in the oil and gas industry) are required by NEC codes to use Class I, Division 1 rated cables. However, users often experience difficulties in handling these armored cables, especially in tight spaces and/or extreme cold weather. This is often due to the effort required to install, move, repair, or replace these armored cables. The upstream oil drilling operations in the Alaskan Arctic slope region is a prime example of such a location or operation. Especially in severely cold weather, the installation or repair personnel need to complete the task in the shortest amount of time, and the cable needs to be resilient enough to withstand rough handling in such environments. This is difficult with current MC-HL armored cable designs.

Likewise, the training radius on currently available products requires more working space for installation, especially at cable terminations. Management of cable loops and extra clearance requirements has become a necessary evil for such installations. While most electrical system designs factor in these spaces and constraints, it is highly desirable in the industry to have cables that are more flexible and have tighter training radii.

A need exists for a flexible armored cable that addresses at least some of the above issues.

DETAILED DESCRIPTION OF EMBODIMENTS

Figure 1:
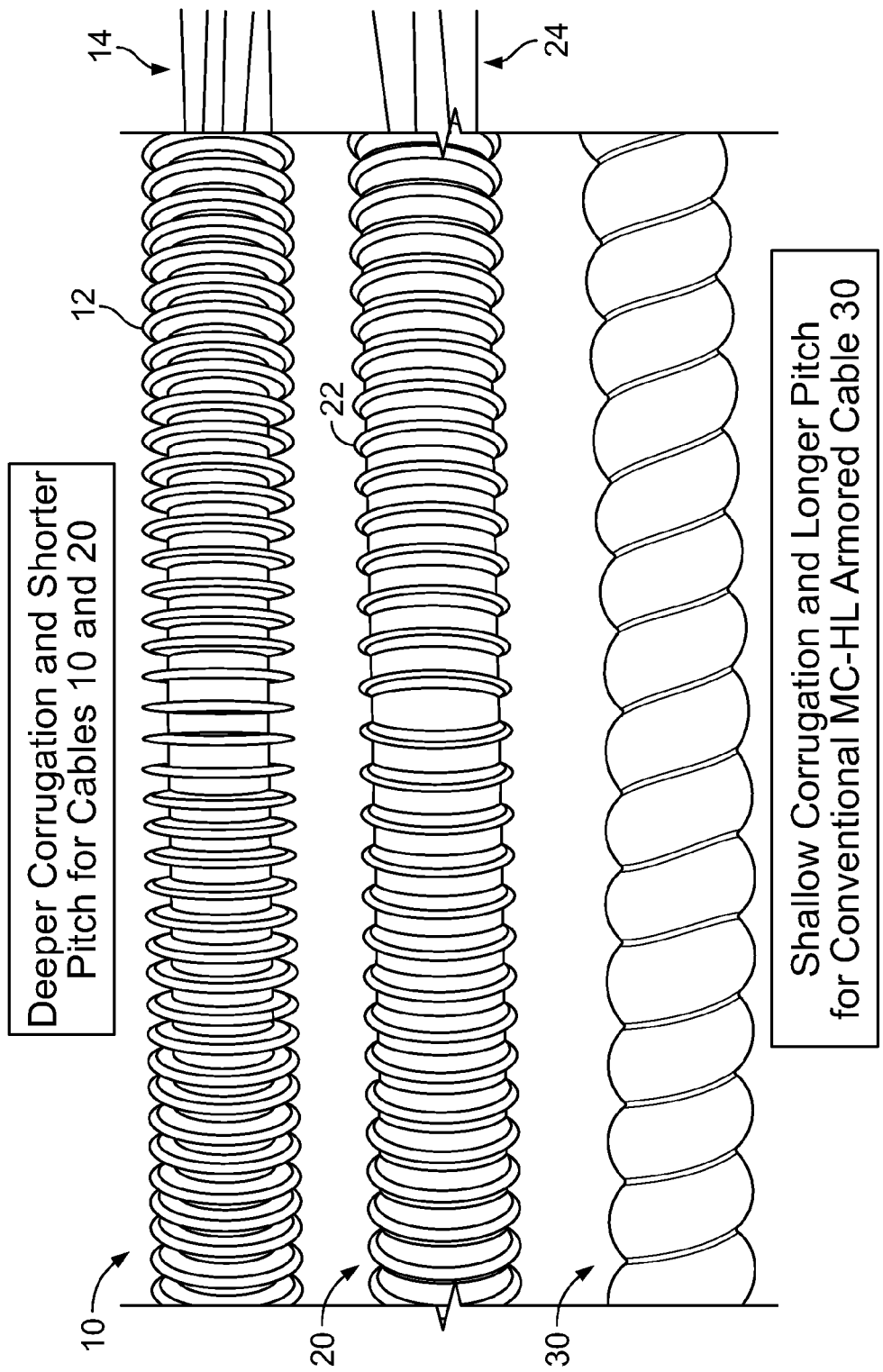
FIG. 1 is a side elevational view of two embodiments of the flexible armored cable of the invention as compared to a prior art armored cable.

In the detailed description of embodiments of the invention, the following definitions apply to the indicated terms:

Alloy: Any combination of one or more metals with another metallic or non-metallic element. An alloy may contain ferrous and/or non-ferrous elements.

Arc Length Controller: A device used in a welding process in which the length of the welding arc is monitored (such as by measuring voltage) and controlled via small adjustments in the torch/welding tip in relation to the welding surface, allowing for increased production rates.

Arc Oscillator: A device used in a welding process in which the welding arc is monitored and controlled with electromagnetic fields or by the movements of mechanical device, making the arc consistent and even throughout the process, allowing for increased production rates.

Armored Cables: A cable core enclosed or wrapped in a protective outer sheath or covering.

Cable Core: One or more wires, conductors, fibers, tubes, ropes, cords, strands, or any combination of the above, which may or may not be twisted, grouped, bunched, bundled, or otherwise assembled. They may be used for various applications, such as analog or digital signal transmission, as well as strength-enhancing or load-bearing applications.

Class I, Division 1: A hazardous area defined by the National Electric Code (NEC), Article 501 as an area in which gases, vapors, and liquids such as acetylene, hydrogen, ether, hydrocarbons, fuel, solvents, or other such materials are present in high enough concentrations to be explosive and hazardous.

Class I, Division 2: A hazardous area defined by the National Electric Code (NEC), Article 501 as an area in which gases, vapors, and liquids such as acetylene, hydrogen, ether, hydrocarbons, fuel, solvents, or other such materials are not typically present in an explosive concentration, but may become so accidentally.

Class I, Zone 0: A hazardous area defined by the National Electric Code (NEC), Article 505 as an area where ignitable concentrations of flammable gases, vapors or liquids can exist all of the time or for long periods at a time under normal operating conditions.

Class I, Zone 1: A hazardous area defined by the National Electric Code (NEC), Article 505 as an area where ignitable concentrations of flammable gases, vapors or liquids can exist some of the time under normal operating conditions.

Class I, Zone 2: A hazardous area defined by the National Electric Code (NEC), Article 505 as an area in which gases, vapors, and liquids such as acetylene, hydrogen, ether, hydrocarbons, fuel, solvents, or other such materials are not typically present in an explosive concentration, but may become so accidentally.

Corrugation: A surface with peaks and valleys created to alter the appearance, strength, or flexibility characteristics of the surface (an example of which is presented in FIG. 3).

Corrugation Depth: A measurement of the distance between the top of a peak and the bottom of a valley in a corrugation, illustrated at 6 in FIG. 3, where the armor is indicated at 7.

Crush Resistance: The ability of an armored cable to withstand a gradually applied force without failing, tested according to the UL 2225 Crushing Test standard.

Fatigue Resistance: The count of the number of cycles an armored cable can be bent and straightened before failure, tested according to the Fatigue Test described below.

Flexural Rigidity: The force couple required to bend a structure to a unit curvature or the resistance offered by a structure while undergoing bending. It is the product of the modulus of elasticity and the moment of inertia of a given object. In this case, it is determined using the Flexural Rigidity Test described below.

High-Frequency Welder: A type of welding machine that joins two surfaces using high-frequency energy pulses to create heat within a material that is then pressed firmly together, creating a weld, allowing for more complete welds and increased production capability.

ITC: An acronym for "Instrumentation Tray Cable." It is a rating and classification of armored cables recognized by Underwriters' Laboratories (UL) for use in lower-voltage Class I, Division 2 and/or Zone 2 locations.

ITC-HL: An acronym for "Instrumentation Tray Cable—Hazardous Locations." It is a rating and classification of armored cables recognized by Underwriters' Laboratories (UL) for use in lower-voltage Class I, Division 1 and/or Zone 0 or Zone 1 hazardous locations.

Impact Strength: The ability of an armored cable to endure repeated impacts of a falling weight without failing, tested according to the UL 2225 Mechanical Impact Test standard.

Laser Welder: A type of welder in which optics are used to provide a highly focused and powerful beam of energy, allowing for the rapid and thorough welding of thick and/or hard materials. Examples of such devices include Class 4 Fiber Lasers. Laser welding is often used in high-volume and precision applications.

Impact Strength: The ability of an armored cable to endure repeated impacts of a falling weight without failing, tested according to the UL 2225 Mechanical Impact Test standard.

MC-HL: An acronym for "Metal Clad—Hazardous Locations". It is a rating and classification of armored cables recognized by Underwriters' Laboratories (UL) as being certified for use in Class I, Division 1 and/or Zone 0 or Zone 1 hazardous locations.

Metal: Any of a class of elementary substances, such as gold, silver, copper, or iron, all of which are crystalline when solid and many of which are characterized by opacity, ductility, conductivity, and a unique luster when freshly fractured. A metal can be ferrous or non-ferrous. They can be found in the periodic table in the groupings of alkali metals, alkaline earth metals, and transition metals. However, alloys or compounds from such different elements are also considered metals.

Pitch: The distance measured between two consecutive peaks or valleys of a corrugated surface, illustrated at 8 in FIG. 3. In addition, this can be notated as the number of peaks or valleys per unit of length, such as "10 per inch" or "120/ft," for example.

PLTC: An acronym for "Power Limited Tray Cable." It is a rating and classification of armored cables recognized by Underwriters' Laboratories (UL) for use in lower-voltage Class I, Division 2 and/or Zone 2 locations.

Pulling Tension: A measure of the amount of force required to pull a cable through and around a simulated installation site, tested according to the Pulling Tension Test described below.

Stainless Steel: An alloy of iron that contains at least 10.4% Chromium, by mass, per the International Stainless Steel Forum (ISSF). Stainless steel often contains nickel, titanium, and/or other various elements for varying properties. Examples of common Society of Automotive Engineers (SAE) designations for different types of stainless steel are: 304, 316, 316L, 321, and 403.

Thoriated Tungsten: A tungsten alloy containing a minimum of 1% (by weight) thorium oxide that is evenly dispersed. It is commonly found in welding applications, where it requires lower arc starting energy, provides a more consistent and stable welding arc, improved longevity, and resistance to weld pool contamination compared to other alloys.

Training Radius: The minimum radius about which an armored cable can be bent and/or installed permanently in an application, measured according to the Training Radius Test described below.

Embodiments of the invention have applicability in a variety of markets and uses where armored cables are employed, such as the oil and gas industry, especially where regulatory and site engineering requirements mandate the use of Class I, Division 1 rated cables.

Non-jacketed embodiments of the armored cable of the invention are indicated in general in FIGS. 1 at 10 and 20. A typical non-jacketed prior art cable is indicated in general in the same figure at 30. Cables 10 and 20 feature an armor 12 and 22, respectively, that is constructed from a strip of metal wound or wrapped around a core. As an example only, the cable core or core may include a number of conductors, indicated in general at 14 and 24 for cables 10 and 20, respectively. A continuous weld joins the strip edges longitudinally and spiral corrugations are then applied, for example, by the use of a mechanical rotating head. Alternatively, the armor may be extruded over the core.

Figure 2:
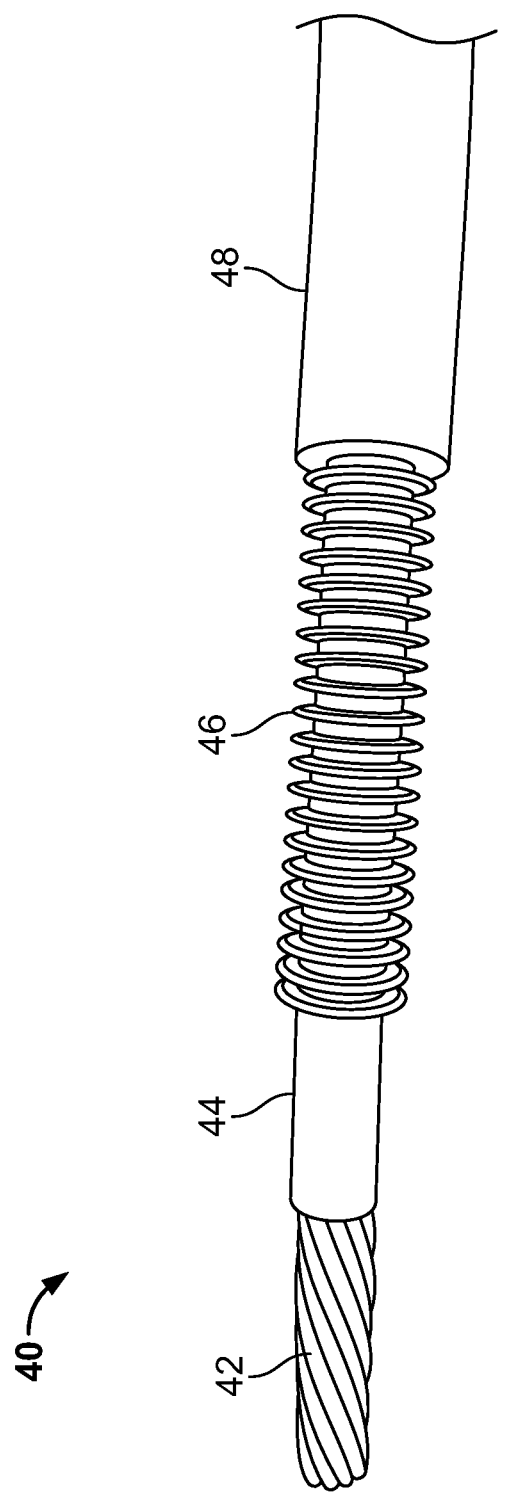
FIG. 2 is a side elevational view of an MC-HL rated armored cable constructed in accordance with an embodiment of the present invention.

A jacketed embodiment of the armored cable of the invention is indicated in general at 40 in FIG. 2. A core 42 consists of multiple insulated electrical conductors, though this is just one of many possible constructions. Inner and outer jackets are optionally provided, as indicated at 44 and 48, respectively. As an example only, the jackets 44 and 48 may be made of an extruded thermoplastic, non-halogenated (TPN) compound. The section indicated at 46 is an armor layer constructed in accordance with an embodiment of the invention. The inner jacket 44 is preferably extruded over the core 42, while the outer jacket 48 is preferably extruded over the armor 46.

It should be understood that while conductors are illustrated and described as the core or core members with respect to the embodiments of FIGS. 1 and 2, the cable core or core may consist of one or more wires, conductors, fibers, tubes, ropes, cords, strands, or any combination of the above, which may or may not be twisted, grouped, bunched, bundled, or otherwise assembled.

In accordance with an embodiment of the present invention, the armored cable, 40, shown in FIG. 2 is constructed from a strip of metal formed around a cable consisting of several conductors. A continuous weld joins the metal longitudinally along the length of the cable, and corrugations are then applied. UL 2225 requires all MC-HL rated cables to have an outer polymeric jacket applied over the armor, as is shown in FIG. 2. In other applications, the outer jacket may not be required.

The armor of embodiments of the invention is made of a thin, yet strong and resilient, corrugated metal and, as illustrated in FIG. 1, features deeper corrugations and a shorter pitch (providing for more corrugations per unit length). These deeper and shorter corrugations add both strength and flexibility, allowing for the use of thinner materials, and further improving flexibility and handling characteristics.

As an example of these design characteristics, the armor labeled as 10 in FIG. 1 has a pitch (indicated at 8 of FIG. 3) of 0.125 inch and a corrugation depth (indicated at 6 in FIG. 3) of 0.085 inch, while the armor labeled as 20 has a 0.160 inch pitch and a 0.060 inch corrugation depth. In addition, and as an example only, the armors labeled as 10 and 20 in FIG. 1 feature a 0.010 inch material thickness.

Figure 3:
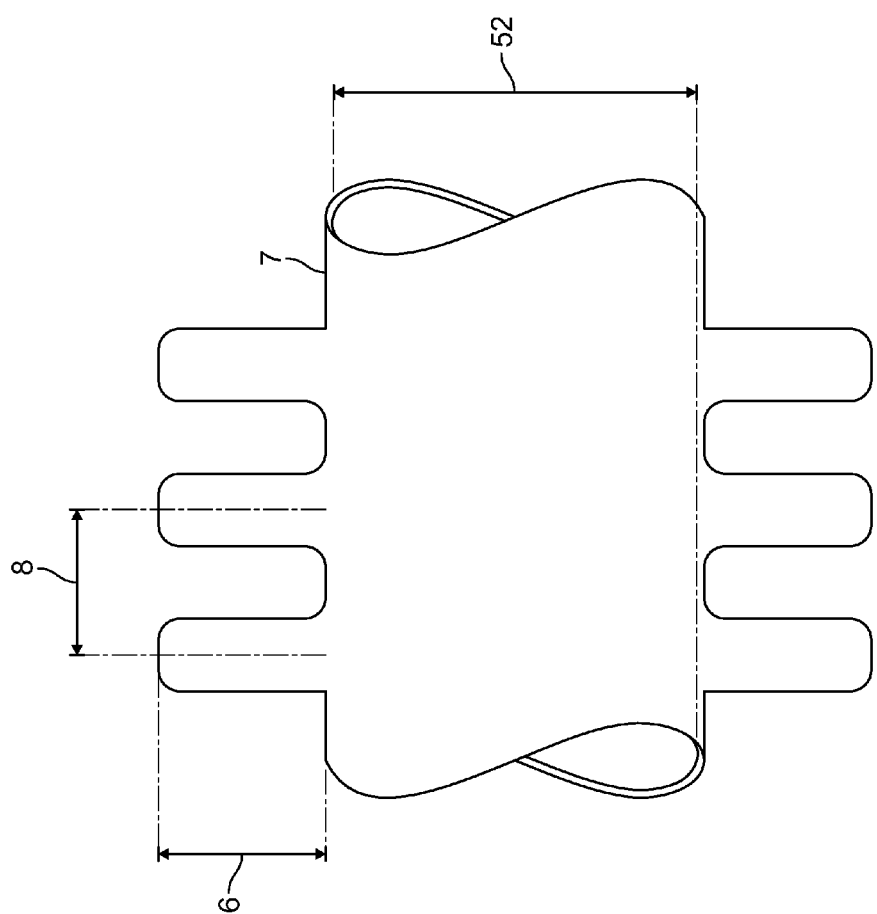
FIG. 3 is a side elevational view of a section of armor sidewall in an embodiment of the armor cable of the invention.
Figure 4:
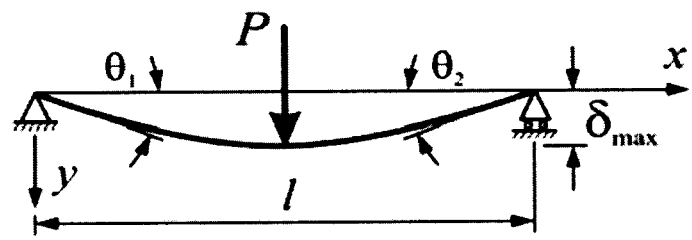
FIG. 4 depicts the formula for flexural rigidity according to aspects of this disclosure.

With reference to FIG. 3, where the inner diameter of the armor is indicated at 52 (and measured from the inner surface of the armor), the armor preferably has a thickness of 0.001 to 0.100 times the inner diameter of the armor, and ideally a thickness 0.002 to 0.060 times the inner diameter of the armor. In addition, the armor preferably has corrugations with a pitch of 0.050 to 1.000 times the inner diameter of the armor, and ideally a pitch of 0.050 to 0.600 times the inner diameter of the armor. Furthermore, the armor preferably has a corrugation depth of 0.010 to 0.400 times the inner diameter of the armor, and ideally a corrugation depth that is 0.020 to 0.400 times the inner diameter of the armor.

As a net result of the above changes in design, embodiments of the cables of the invention are more flexible, can be bent around tighter bends, and offer significantly higher fatigue resistance. These characteristics allow for quicker and easier installations, especially in more confined spaces, while almost eliminating the potential for breaking the armor.

The design of the armor contributes to all of the performance improvements. More specifically, the deep corrugations, shorter pitch, and the use of thinner material provide the higher performance criteria, as indicated in the prior section. The tighter and deeper corrugations provide more hoop strength, allow the armor to bend more easily and increase pliability, and allow for a tighter bending radius. The peaks of the corrugation and higher number of such peaks within the UL Impact test impact point act as a crumple zone. This crumple zone absorbs the bulk of the impact force and less of it is transferred to the cable insulation to cause insulation damage and an electrical short. This design aspect enables the cable to withstand the impact force, such as that from the UL Impact test described above, without failure.

Embodiments of the armored cable of the invention provide many improvements and/or benefits compared to typical MC-HL armored cables, including:

Flexural Rigidity: Some embodiments of the armored cable of the invention are six times more flexible than conventional MC-HL cables when tested in using the Flexural Rigidity Test described below. Stated differently, these cables have $\frac{1}{6}$.sup.th the flexural rigidity of conventional MC-HL cables when tested using the test. The combination of deeper corrugations, shorter pitches, and thinner material provides more flexibility in the armored cables. In extremely cold weather, for instance, such improvements allow an installer to install, terminate, repair, or replace the cables more quickly and easily.

Tighter Training Radius: Some embodiments of the armored cable of the invention can be bent around a 50% tighter training radius as compared to conventional Class I, Division 1 rated armored cables when tested using the Training Radius Test described below. This property allows the cables to be used where space is limited.

Fatigue Resistance: Some embodiments of armored cable of the invention have one hundred times greater fatigue resistance than typical MC-HL armored cables when tested using the Fatigue Test described below. If a typical prior art armored cable is bent back and forth repeatedly, it will usually fail in about twenty-five cycles. Some embodiments of the invention can be bent and unbent as many as two thousand times or more without any noticeable degradation of the armor. The ability to flex the cable alleviates the fear of fatigue failure or fracture of the armor at the time of installation or when making repairs to equipment.

Impact Resistance: Some embodiments of the armored cable of the invention have two and one half times better impact resistance than required when tested per the UL 2225 standard. Embodiments of the armored cable pass impact tests with thinner armor than typical MC-HL armored cables. The armor absorbs impact forces more effectively and transfers less of the impact force to the cable core. This alleviates damage that would cause test failures, such as a conductor-to-conductor or conductor-to-ground short. The design of the armor acts very much like the crumple zone on devices such as automotive bumpers, absorbing the force of the impact. The ability to withstand higher impact forces helps the cable survive unexpected events that may happen in a Class I, Division 1 installation.

Crush Strength: Some embodiments of the armored cable of the invention have 1.8 times more crush strength than required when tested per the UL 2225 standard. When gradual force is applied during the test, the armor deforms, again, absorbing the force. In comparison, the armor of typical prior art MC-HL cables often fails, allowing force to be applied directly to the core of the cable, causing a failure, such as a conductor-to-conductor or conductor-to-ground short.

Improved Serviceability of Cable & Components: Due to the characteristics of lower flexural rigidity and improved fatigue resistance, some embodiments of the armored cable of the invention can be disconnected and reconnected without any concern of armor breakage, and with less exertion from the installation or repair personnel. Such characteristics are a great asset in situations such as a failed spool valve on an arctic drilling rig. With a cable armored with an embodiment of the invention, the cable could remain attached to the valve's control body, while the body is removed from the rig and secured out of the way. The valve itself could then be repaired or replaced, and the control body could be reattached, without fear of the armor failing and becoming unsuitable for use in such an area. A typical prior art MC-HL type cable would often fail in such cases. To prevent this, the cable would be run longer than needed to allow for a short length at the end to be cut off. The cut end of the cable would then have to be stripped and sealed in the connector once again, costing both time and money.

Improved Handling: The lower flexural rigidity and a tighter training radius allow some embodiments of the armored cable of the invention to be placed on smaller reels or other packaging, and are easier to coil and uncoil than typical MC-HL type cables.

Less Pulling Resistance: Some embodiments of the armored cable of the invention can be pulled through conduit or in a cable tray with less pulling resistance than typical prior art MC-HL armored cables when tested to the Pulling Tension Test described below. The smoother outer jacket and lower flexural rigidity allow the cable to conform to the bends of the installation site more easily and produce less friction or drag. As an example only, some embodiments of the armored cables may provide 25% less pulling resistance than comparable prior art cables.

Easier Outer Jacket Removal: The smooth outer jacket is easier to strip and remove from the armor in some embodiments of the armored cable of the invention.

The various potential embodiments of this invention may include many various materials, though most commonly metals or alloys. These materials may either be extruded or formed, though more commonly formed. In cases where the materials are formed, they are typically joined or sealed using adhesives or a welding process, more commonly a welding process.

In such cases, the design and material of certain embodiments of the invention aids the manufacturing process with the use of specialized materials and devices. For example, edge trimming of feed stock for some embodiments is not required to produce a clean surface for joining during a welding process when metals or alloys having low oxidation rates are used as the armor.

Process efficiency may be improved by more than 300% in some embodiments of the invention by combining the use of high-frequency or laser welding with arc length controllers and/or arc oscillators. This is especially true of materials that are more corrosion resistant and materials with higher melting temperatures. Furthermore, these devices and processes improve the quality and consistency of the welds themselves.

The use of shielding gas consisting of a minimum of 25% argon gas (by volume) also increases the consistency, effectiveness, and speed of the welding process.

Use of specialized tungsten alloy welding tips, such as thoriated tungsten, further improve the consistency of welding processes, while also decreasing maintenance requirements. These tips may be radioactive or non-radioactive in type. These tips are especially crucial in high-volume production applications, where downtime has a significant negative effect on output. In addition, seam tracker and/or edge-holding devices may be used during the welding.

While the flexible armored cables of the invention have a wide, almost limitless range of potential applications, embodiments described above are particularly advantageous for use in Class I, Division 1 hazardous locations or other applications where traditional armors fall short. The flexible armored cable provides superior flexibility, handling, and fatigue characteristics, all while meeting and exceeding the stringent strength requirements of MC-HL cables. The flexible armored cable is ideal for installations that require tighter bends and improved flexibility, need to withstand numerous bending cycles, and need to withstand higher mechanical impact and crushing forces.

Armored Cable Testing Methods and Systems:

Flexural Rigidity Test

This test measures the flexibility of an armored cable in terms of flexural rigidity, which is the product of the modulus of elasticity and the moment of inertia of the cable. A sample of the cable is cut and placed on a test stand, where an anvil is moved downward at a constant rate to bend the cable. Readings of the force generated by this anvil pressing on the cable are recorded and graphed by the test stand. Once the anvil has reached the end of its travel, it is to return to its starting position. Using the data gathered by the test stand, the flexural rigidity of the cable can be determined.

To prepare the sample for testing, the end of the cable is cut using pipe or tubing cutters and de-burred. This is critical, as failure to do this could prevent the cable's core from moving within the armor, skewing the results. Once cut and de-burred sufficiently, the core is cut using shears or any other suitable method. This procedure is repeated further down the cable, so as to produce a sample of sixteen inches in length with un-crimped or otherwise deformed ends.

The sample of cable is placed on a test stand for testing. The test stand is to consist of three main components; a compression machine, a support stand or base, and an anvil.

The compression testing machine (which may be, as an example only, an INSTRON 3300-series tension and compression testing machine available from Instron of Norwood, Mass.) features a moveable crosshead, a fixed base, and is able to record data in real-time utilizing a computer. The computer is loaded with software that uses the compression testing machine's real-time data to calculate the flexural rigidity of the specimen based on a modified version of a simply supported beam deflection formula. An example of a suitable software program is the DekaTest FlexTest 1.0 program. (e.g., Bluehill Lite) available from Dekoron Wire & Cable LLC of Mt. Pleasant, Tex.

The anvil preferably is approximately two inches in width by six inches in length, and is made of a plate of steel with a ¾ inch diameter steel rod of approximately six inches in length attached to the plate. The axis of revolution of the rod is to be aligned with the centerline of the plate, so that the ends of the rod and plate are nearly flush. The anvil is fastened securely to the compression machine's load cell on the moving crosshead and centered above the base, so that when the sample is installed, the axis of revolution of the rod is perpendicular to the axial centerline of the sample.

The anvil preferably is approximately two inches in width by six inches in length, and is made of a plate of steel with a ¾ inch diameter steel rod of approximately six inches in length attached to the plate. The axis of revolution of the rod is to be aligned with the centerline of the plate, so that the ends of the rod and plate are nearly flush. The anvil is fastened securely to the compression machine's load cell on the moving crosshead and centered above the base, so that when the sample is installed, the axis of revolution of the rod is perpendicular to the axial centerline of the sample.

The polycarbonate rollers are smooth and free of snags on their surface. Each features a V-shaped, machined groove in the middle of the roller with a depth of at least ½ inch and a slightly obtuse, symmetrical angle. This groove is to keep the cable centered while the anvil is being lowered.

The cable sample is straightened prior to being placed on the support stand. Then, the anvil is lowered so that it is contacting the uppermost surface of the cable—it should not be putting any pressure on the cable however. The test stand's program is to be run, moving the crosshead and anvil down three inches at a rate of three inches per minute and recording the pressure in the cable for the duration of this movement.

The test stand's program is able to determine the flexural rigidity of the cable, in addition to plotting the graph of the forces experienced by the cable during the test, the modulus, and various other points for reference. The flexural rigidity is recorded, and the test is repeated two more times for a total of three tests. The average flexural rigidity of the three tests is reported.

A table of sample data for embodiments of the armored cable of the invention from the Flexural Rigidity Test is provided as Table 2.

TABLE 2

Flexural Rigidity Testing Results

| Description | Max Load (lbf) | Flexural Rigidity | Young's Modulus (ksi) | Moment of Inertia | Load at Yield Point (lbf) | Ext. at Yield Point (in) | Load at Zero Slope (lbf) | Ext. at Zero Slope (in) |
|---|---|---|---|---|---|---|---|---|
| 3 Cd, 14 AWG, 3 Bare Gds, PVC/Nylon, LDPE, DekaFlex®, TPN | 11.83 | 527.2 | 0.072 | 7322 | 0.59 | 0.065 | 11.09 | 2.445 |
| 3 Cd, 14 AWG, 3 Bare Gds, PVC/Nylon, Filler, LDPE, DekaFlex®, TPN | 11.68 | 556.5 | 0.076 | 7322 | 0.65 | 0.067 | 10.99 | 2.418 |
| 3 Cd, 14 AWG, 3 Bare Gds, XLPE, LDPE, DekaFlex®, TPN | 13.05 | 593.3 | 0.078 | 7606 | 0.76 | 0.073 | 12.75 | 2.650 |
| 3 Cd, 14 AWG, 3 Bare Gds, XLPE, Filler, LDPE, DekaFlex®, TPN | | | | | | | | |
| 3 Cd, 14 AWG, 3 Bare Gds, PVC/Nylon, LDPE, Gardex®, TPN | 19.42 | 3554.1 | 0.699 | 5085 | 5.00 | 0.080 | 19.10 | 1.680 |
| 3 Cd, 14 AWG, 3 Bare Gds, PVC/Nylon, Filler, LDPE, Gardex®, TPN | 20.57 | 3754.3 | 0.768 | 4888 | 4.57 | 0.070 | 20.32 | 2.018 |
| 3 Cd, 14 AWG, 3 Bare Gds, XLPE, LDPE, Gardex®, TPN | 19.88 | 3151.0 | 0.598 | 5269 | 4.23 | 0.077 | 19.76 | 2.247 |
| 3 Cd, 14 AWG, 3 Bare Gds, XLPE, Filler, LDPE, Gardex®, TPN | 18.87 | 3052.9 | 0.539 | 5664 | 3.54 | 0.067 | 18.63 | 2.027 |
| 3 Cd, 14 AWG, 3 Bare Gds, PVC/Nylon, TPN, DekaFlex®,TPN | 11.16 | 527.2 | 0.071 | 7425 | 0.58 | 0.063 | 10.60 | 2.945 |
| 3 Cd, 14 AWG, 3 Bare Gds, PVC/Nylon, Filler, TPN, DekaFlex®,TPN | 12.17 | 539.8 | 0.072 | 7497 | 0.73 | 0.078 | — | — |
| 3 Cd, 14 AWG, 3 Bare Gds, XLPE, TPN, DekaFlex®, TPN | 11.72 | 586.3 | 0.071 | 8258 | 0.52 | 0.052 | 11.59 | 2.817 |
| 3 Cd, 14 AWG, 3 Bare Gds, XLPE, Filler, TPN, DekaFlex®, TPN | | | | | | | | |
| 3 Cd, 14 AWG, 3 Bare Gds, PVC/Nylon, TPN, Gardex®, TPN | 19.46 | 3789.6 | 0.778 | 4871 | 4.41 | 0.067 | 19.15 | 1.887 |
| 3 Cd, 14 AWG, 3 Bare Gds, PVC/Nylon, Filler, TPN, Gardex®, TPN | 19.04 | 3730.1 | 0.777 | 4801 | 4.57 | 0.070 | 18.83 | 1.683 |
| 3 Cd, 14 AWG, 3 Bare Gds, XLPE, TPN, Gardex®, TPN | 19.30 | 3345.6 | 0.593 | 5642 | 4.60 | 0.077 | 19.11 | 1.890 |
| 3 Cd, 14 AWG, 3 Bare Gds, XLPE, Filler, TPN, Gardex®, TPN | 20.60 | 3335.7 | 0.585 | 5702 | 4.05 | 0.070 | 20.53 | 2.107 |

Training Radius Test

This test serves to determine the minimum radius an armored cable can be bent and installed permanently. This is not an indication of the radius a cable can be bent to while being installed under tension.

A three to four feet long section of cable is cut. The cable should be as straight as possible, and should not have been previously kinked or bent severely, as this would skew the test. The outer diameter of the cable is measured and recorded.

The cable is grasped firmly at both ends, and the ends are slowly brought together, taking care not to kink the cable. If the cable ends cannot be brought together, repeat the test is repeated with a longer sample of cable.

The left end of the cable is grasped with a tester's right hand, and the right end is grasped with the tester's left hand. The tester continues pulling the ends of the cable, this time away from each other, tightening the bend. The cable's outer walls are kept in contact with themselves, so as to make more of a circular shape, as opposed to a spiral. Small adjustments are made to the cable to keep the shape circular. A mandrel may be used to assist in this if one is available. A flat surface can also be used to assist in preventing the cable from spiraling.

The cable is to be bent until a kink or other such deformation occurs, the peaks of the corrugations of the armor touch, or the cable is incapable of being bent any tighter without the assistance of a machine or the addition of leverage.

The distance between two points opposite each other about the center of the bend of the innermost portions of the cables are measured and recorded. A second measurement is taken between two points along a similar axis that is perpendicular to the first. The average of the two measurements is calculated, and then divided by two. This figure is divided by the cable's diameter which was previously recorded. This will yield the minimum training radius ratio.

The test is repeated a second time to verify the results. If the results cannot be confirmed, a third test is conducted, and all three test results are averaged.

A table of data for embodiments of the armored cable of the invention from the Training Radius Test is provided as Table 3.

TABLE 3

Bending Test

| Description | Cable Diameter | Bending Diameter | Ratio | Difference |
|---|---|---|---|---|
| Prior Art MC-HL Armor | 0.690 | 2.5 | 3.6 | 42.5% |
| Invention Embodiment | 0.720 | 1.5 | 2.1 | |

Fatigue Test

This test serves to simulate repeated installation and removal of an armored cable, in addition to simulating an installation where a cable is required to move or bend repeatedly. This is particularly representative of temporary job sites, floating platforms, and other such cases. This test secures and seals a section of cable to a test stand, and fills the cable with pressurized air. The cable is then bent about a mandrel repeatedly by a test stand, while the pressure in the cable is monitored. A failure of the armor will result in a loss of pressure. The number of bending cycles until failure is to be recorded.

Prior to testing, a cable sample of four to six feet in length is cut. If so equipped, the outer jacket is to be removed from the first six inches of each end of the cable.

Once the outer jacket is removed, a sealing cap is applied and secured to one end of the cable. The other end of the cable is sealed using a tube connected to a pressure gauge, valve, and air line fitting. When both are in place, the system is checked for leaks by connecting the air line fitting to an air hose and air compressor. If leaks occur, the clamps are tightened on the seals, or other adjustments are made. The test does not proceed until the cable is sealed and no leaks occur.

A test stand is required for testing. This test stand consists of an electric motor with an adjustable length crank arm, a rod with pivoting head, a mandrel, and a counter. The motor is a variable speed unit which drives the crank. The crank's length is adjustable, depending on the cable's diameter and the attachment point. The crank moves a rod which is secured to the cable using a pivoting clamp. The cable is held in position on the stand by a clamp at the base of the cable, and the pivoting clamp on the rod at top. The crank and rod bend the cable about 90 degrees around a mandrel. The mandrel is six to eight times the diameter of the cable. The test stand is designed so that the crank and rod pull the cable around the mandrel in one plane. A small counter is affixed to the stand so that the count is increased by one for every full rotation of the crank.

The sealed cable assembly is affixed to the test stand and the bottom of the cable (the end with the valve and gauge) is secured to the test stand's support. The other end of the cable is secured to the test stand's crank arm.

Once fitted in place, the outer jacket (if so equipped) of the cable is cut along a side of the cable that is not in contact with the test stand. The cut penetrates the jacket and exposes the armor, but does not gouge or otherwise damaging the armor. This slit allows any air present to escape, rather than remaining trapped under the jacket. The slit should be as long as the length of cable making contact with the mandrel, and should be approximately on the cable's centerline.

The crank and rod are operated by hand for one rotation to check for clearance, the correct amount of travel and bending, and to verify that no leaks occur. If no issues are found, the machine is started and the speed of the motor adjusted to a reasonable pace (for example: 15-25 RPM).

The tester ensures that the cable is pressurized. While the cable is being bent, the pressure gauge is monitored. If the pressure drops, the armor has failed to maintain its hermetical seal. The motor is stopped and the number of revolutions of the crank shown on the counter is recorded.

The test is repeated once more to confirm the results. If the results cannot be confirmed, a third test is conducted, and all three test results are averaged.

A table of data for embodiments of the armored cable of the invention from the Fatigue Test is provided as Table 4.

TABLE 4

| Cable Information Description | Fatigue Testing Results Cycles |
|---|---|
| 3 Cd, 14 AWG, 3 Bare Gds, PVC/Nylon, TPN, Invention Embodiment, TPN | 2250 |
| 3 Cd, 14 AWG, 3 Bare Gds, PVC/Nylon, Filler, TPN, Invention Embodiment, TPN | 2000 |
| 3 Cd, 14 AWG, 3 Bare Gds, PVC/Nylon, TPN, Prior Art MC-HL Armor, TPN | 19 |
| 3 Cd, 14 AWG, 3 Bare Gds, PVC/Nylon, Filler, TPN, Prior Art MC-HL Armor, TPN | 25 |

Pulling Tension Test

There are two portions of this test procedure.

In the first portion of the test, a length of cable is wound on a reel then pulled around a series of smaller reels to simulate a low-friction pulling installation. The peak tension required to pull a length of cable through these reels is recorded.

An armored cable of at least fifty feet in length is wound around the drum of a wooden cable reel of flange diameter of thirty-six inches, a traverse of thirty inches in width, and a drum diameter of eighteen inches. The reel is held off of the ground on a payoff device, and is free to turn or freewheel about the reel's center axis. The height of the reel is adjusted so that the cable exiting the reel travels nearly horizontally towards a series of smaller wooden and steel composite reels with thirty inch diameter flanges, a twenty inch traverse, and a sixteen inch drum diameter.

Three of these smaller reels are placed on axles, spindles, or payoffs spaced three feet apart from each other. All three reels are aligned so that their flanges are parallel and flush with each other. All three reels should be able to spin freely or freewheel about their axis of rotation.

The reel of cable is positioned so that the centerline of the reel, perpendicular to the axis of rotation, is aligned with the same center line of the three smaller reels.

The cable is passed under the drum of the smaller reel closest to the reel of cable and the middle reel. It is wound around the middle reel's drum so that the head-end of the cable is facing the first reel again, though is not on top of the drum, making a 180 degree bend. The cable is to be pulled further, so that it can wrap around the first small reel, again, making a 180 degree bend. The head-end should now be facing away from the cable reel. The cable is pulled again under the drum of the first and second reel, before being pulled upward to allow the cable to rest on top of the third reel's drum. A length of cable is extended beyond this third reel, so that a tension gauge may be attached.

The cable is securely attached to one end of a tension gauge, and a handle for an operator is to be attached to the other end of the gauge. Once attached, the position of the handle is to be marked. A second mark is placed ten feet further away from the cable reel along the centerline described earlier.

The cable is then pulled steadily by an operator, while an assistant observes the tension gauge. When the handle reaches the second mark after being pulled ten feet, the operator can stop pulling. The highest reading registered on the tension gauge is recorded.

The test is repeated once more to confirm the results. If the results cannot be confirmed, a third test is conducted, and all three test results are averaged.

The second portion of this test uses two 90-degree bend sections of conduit. Using the same payoff and cable reel, the cable is pulled through the two bends, and the peak tension is recorded.

The conduit sections are of sufficient size to accommodate the cable, but not excessive in size. Ideally, the inner diameter of the conduit is about two times greater than the outer diameter of the cable sample. They are fastened together in an S-shape so that the cable enters the first horizontal section, then travels vertically in an upward direction, before exiting horizontally again, traveling in the same direction as it was originally. The conduit is secured to a wall, test stand, or other object so as to keep them from moving. They should be placed at chest height.

The payoff used in the first section of this test and the cable reel are reused. They are positioned so that the cable enters the conduit nearly horizontally, and so that the centerline of the conduit is aligned with the center of the traverse of the cable reel.

A leader is attached to the cable and is fished through the conduit. The cable is then pulled through the conduit, so that the leader can be removed and the end of the cable exposed.

The tension gauge and handle from the first section is attached to the end of the cable after it has been fished through the conduit. The location of the handle is marked, and a second mark is made ten feet further away from the cable reel, as described in the first section.

The cable is steadily pulled while an assistant observes the tension gauge. Pulling is stopped when the second mark is reached. The highest tension is recorded.

Given the nature of the test, any damage that may occur to the cable during the test is noted.

The test is repeated once more to confirm the results. If the results cannot be confirmed, a third test is conducted, and all three test results are averaged.

While the preferred embodiments of the invention have been shown and described, it will be apparent to those skilled in the art that changes and modifications may be made therein without departing from the spirit of the invention, the scope of which is defined by the appended claims.

What is claimed is:

1. An armored cable comprising:
a) a core;
b) an armor generally surrounding the core and having an inner diameter;
c) said armor having a thickness of 0.001 to 0.100 times the inner diameter of the armor;
d) said armor having corrugations with a pitch of 0.050 to 1.000 times the inner diameter of the armor;
e) said armor to have a corrugation depth of 0.010 to 0.400 times the inner diameter of the armor; and
wherein the armor is configured to protect the core from moisture, chemical exposure, gaseous ingression, and mechanical damage; and
wherein the corrugations include side walls, and wherein the side walls are substantially perpendicular to a lengthwise axis of the core.

2. The armored cable of claim 1, wherein said armor has a thickness 0.002 to 0.060 times the inner diameter of the armor.

3. The armored cable of claim 1, wherein the corrugations have a pitch of 0.050 to 0.600 times the inner diameter of the armor.

4. The armored cable of claim 1, wherein the corrugation depth is 0.020 to 0.400 times the inner diameter or the armor.

5. The armored cable of claim 1, further comprising an outer polymeric jacket generally surrounding the armor.

6. The armored cable of claim 5, further comprising an inner polymeric jacket positioned between the core and the armor so as to generally surround the core.

7. The armored cable of claim 1 wherein the armor is comprised of metal or alloy.

8. The armored cable of claim 7, wherein the armor is comprised of stainless steel.

9. The armored cable of claim 7, wherein the armor is formed from a strip or extruded.

10. The armored cable of claim 1, wherein the armored cable meets the requirements of Underwriters Laboratory 2225 Mechanical Damage—Impact Test as specified in UL 2225 Standard for Safety—Cables and Cable-Fittings For Use In Hazardous (Classified) Locations, Fourth Edition, Dated Sep. 30, 2013.

11. The armored cable of claim 1, wherein the armored cable meets the requirements of Underwriters Laboratory 2225 Crushing Test as specified in UL 2225 Standard for Safety—Cables and Cable-Fittings For Use In Hazardous (Classified) Locations, Fourth Edition, Dated Sep. 30, 2013.

12. The armored cable of claim 1, wherein the fatigue resistance is greater than 25 cycles.

13. The armored cable of claim 1, wherein the fatigue resistance is greater than or equal to 100 cycles.

14. The armored cable of claim 1, wherein the fatigue resistance is greater than or equal to 2000 cycles.

15. The armored cable of claim 1, wherein the fatigue resistance is between 2000 and 2250 cycles.

16. The armored cable of claim 1, wherein the armored cable has a flexural rigidity that is less than 3052.9 lbs·in$^2$.

17. The armored cable of claim 1, wherein the armored cable has a flexural rigidity that is less than or equal to ⅙ of a typical MC-HL, armored cable.

18. The armored cable of claim 1, wherein the armored cable has a ratio of flexural rigidity to cable diameter that is less than 4424 lbs*in.

19. The armored cable of claim 1, wherein the armored cable has a training radius wherein a ratio of bending diameter to cable diameter is less than 3.6.

20. The armored cable of claim 1, wherein the armored cable has a training radius wherein a ratio of bending diameter to cable diameter is less than or equal to 2.1.

21. The armored cable of claim 1, wherein the armored cable has a pulling resistance that is at least 25% less than the pulling resistance of a typical MC-1-11, armored cable.

22. An armored cable comprising:
a) a core;
b) an armor generally surrounding the core and having an inner diameter;
c) said armor having a thickness of 0.001 to 0.100 times the inner diameter of the armor;
d) said armor having corrugations with a pitch of 0.050 to 1.000 times the inner diameter of the armor;
e) said armor to have a corrugation depth of 0.010 to 0.400 times the inner diameter of the armor;
wherein the armor is comprised of metal or alloy;
wherein the armor is formed from a strip or extruded;
wherein the armored cable meets the requirements of Underwriters Laboratory 2225 Mechanical Damage—Impact Test as specified in UL 2225 Standard for Safety—Cables and Cable-Fittings For Use In Hazardous; (Classified) Locations, Fourth Edition, Dated Sep. 30, 2013; and
wherein the corrugations include side walls, and wherein the side walls are substantially perpendicular to a lengthwise axis of the core.

23. The armored cable of claim 22, wherein the armored cable meets the requirements of Underwriters Laboratory 2225 Crushing Test, as specified in UL 2225 Standard for Safety—Cables and Cable-Fittings For Use In Hazardous (Classified) Locations, Fourth Edition, Dated Sep. 30, 2013.

24. The armored cable of claim 22, wherein the armored cable has a fatigue resistance that is greater than 25 cycles.

25. The armored cable of claim 22, wherein the armored cable has a ratio of flexural rigidity to cable diameter that is less than 4424 lbs*in.

26. The armored cable of claim 22, wherein the armored cable has a training radius wherein a ratio of bending diameter to cable diameter is less than 3.6.

27. An armored cable comprising:
a) a core;
b) an armor generally surrounding the core and having an inner diameter;
c) an outer polymeric jacket generally surrounding the armor;
d) an inner polymeric jacket positioned between the core and the armor so as to generally surround the core;
e) said armor having a thickness of 0.002 to 0.060 times the inner diameter of the armor;
f) said armor having corrugations with a pitch of 0.050 to 0.600 times the inner diameter of the armor;
g) said armor to have a corrugation depth of 0.020 to 0.400 times the inner diameter of the armor; and
wherein the armor is comprised of stainless steel;
wherein the armor is formed from a strip or extruded;
wherein the armor is configured to protect the core from moisture, chemical exposure, gaseous ingression, and mechanical damage; and
wherein the corrugations include side walls, and wherein the side walls are substantially perpendicular to a lengthwise axis of the core.

28. The armored cable of claim 27, wherein the armored cable meets the requirements of Underwriters Laboratory 2225 Mechanical Damage—Impact Test as specified in UL 2225 Standard for Safety—Cables and Cable-Fittings For Use In Hazardous (Classified) Locations, Fourth Edition, Dated Sep. 30, 2013.

29. The armored cable of claim 27, wherein the armored cable meets the requirements of Underwriters Laboratory 2225 Crushing Test, as specified in UL 2225 Standard for Safety—Cables and Cable-Fittings For Use In Hazardous (Classified) Locations, Fourth Edition, Dated Sep. 30, 2013.

30. The armored cable of claim 1, wherein the corrugation side walls are substantially parallel to each other.

31. The armored cable of claim 22, wherein the corrugation side walls are substantially parallel to each other.

32. The armored cable of claim 27, wherein the corrugation side walls are substantially parallel to each other.

* * * * *